Jan. 19, 1932.  J. A. ALEGRIA  1,842,059
SEED PLANTER
Filed May 13, 1929   2 Sheets-Sheet 1
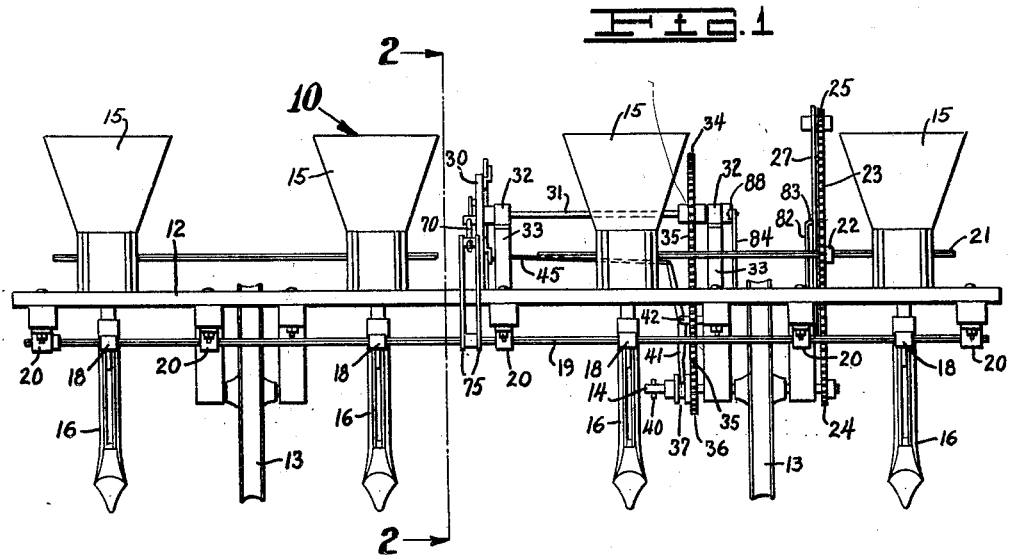
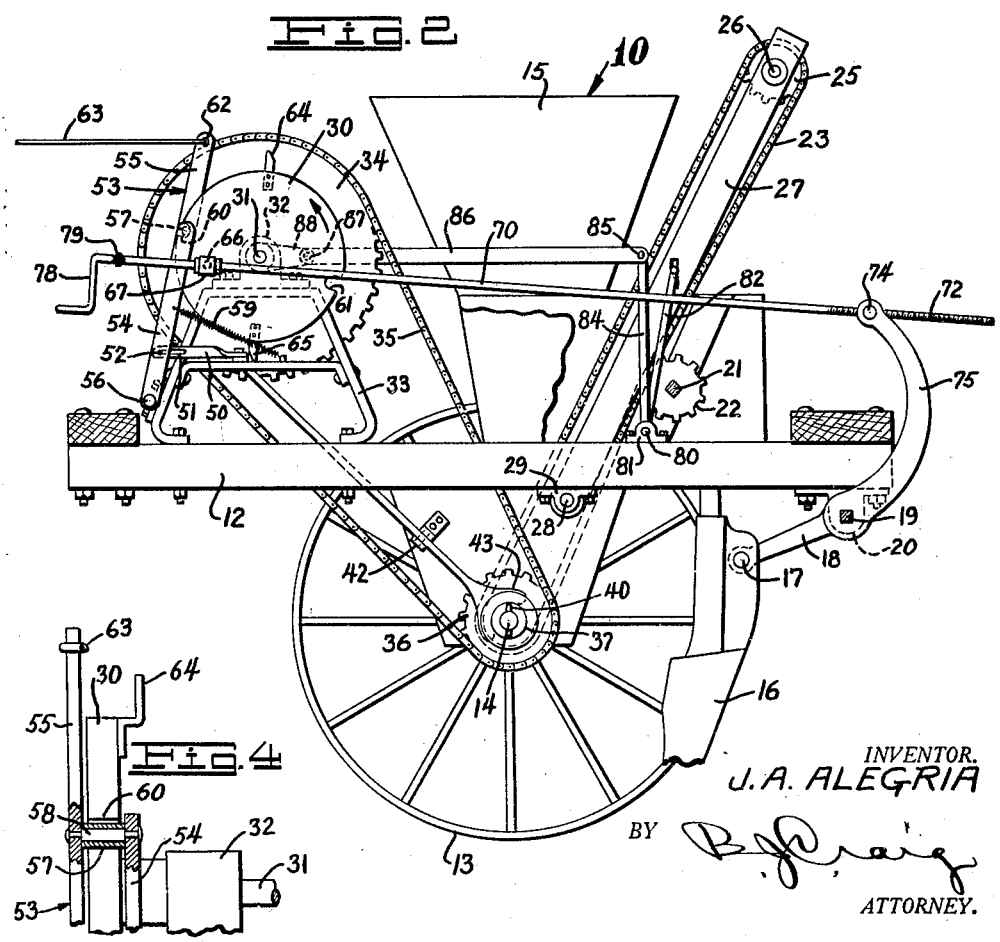
INVENTOR.
J. A. ALEGRIA
BY
ATTORNEY.

Jan. 19, 1932.　　　J. A. ALEGRIA　　　1,842,059
SEED PLANTER
Filed May 13, 1929　　　2 Sheets-Sheet 2
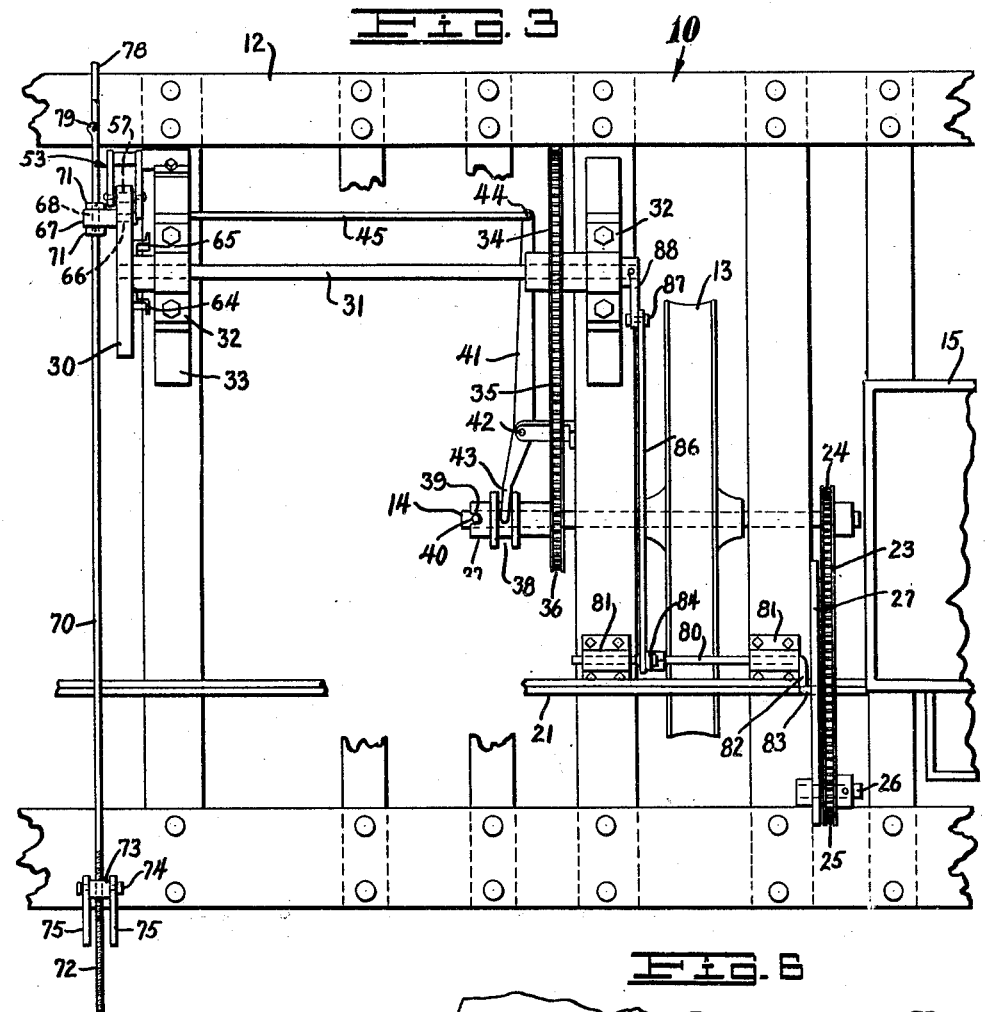
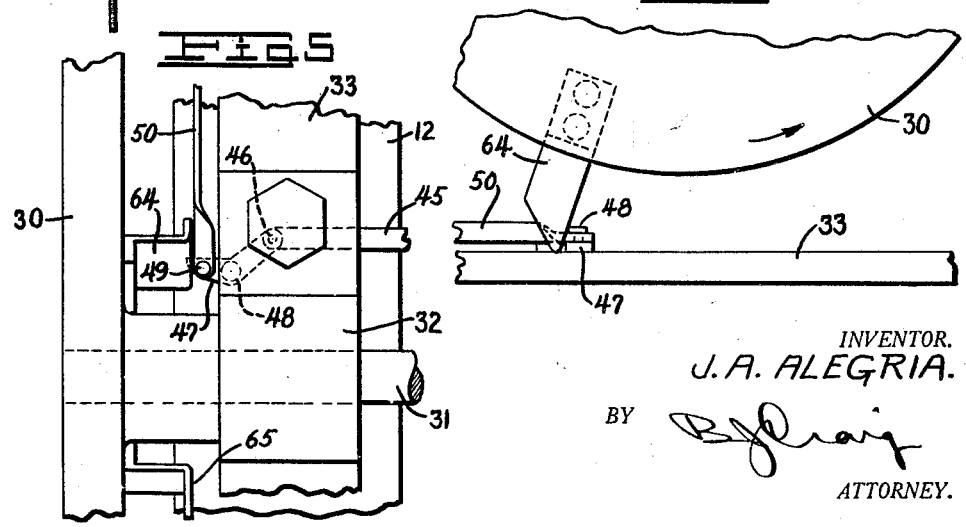
INVENTOR.
J. A. ALEGRIA.
BY
ATTORNEY.

Patented Jan. 19, 1932

1,842,059

UNITED STATES PATENT OFFICE

JULIAN A. ALEGRIA, OF GOLETA, CALIFORNIA

SEED PLANTER

Application filed May 13, 1929. Serial No. 362,471.

This invention relates to improvements in seed planters.

The general object of this invention is to provide a seed planter having an improved means for raising and lowering the seed drills of the planter.

Another object of the invention is to provide a planter having a power means to raise and lower the seed drills.

Other objects and the advantages of this invention will be apparent from the following description taken in connection with the accompanying drawings wherein:

Fig. 1 is a rear view of a planter embodying the features of my invention.

Fig. 2 is an enlarged section taken on line 2—2 of Fig. 1.

Fig. 3 is an enlarged fragmentary top plan view of parts shown in Fig. 1.

Fig. 4 is an enlarged fragmentary front view of the disk and control arm partly in section.

Fig. 5 is an enlarged fragmentary top plan view of the disk and associate parts and Fig. 6 is an enlarged fragmentary side view of the disk.

Referring to the drawings by reference characters I have indicated a seed planter embodying the features of my invention generally at 10. My invention may be applied to planters of various types but as shown the planter 10 includes a frame 12 supported on a plurality of wheels 13 which are secured to shafts 14. Mounted on the frame 12 there are a plurality of seed hoppers 15 which supply the seeds to the drills 16.

Each of the seed drills 16 is pivotally secured as at 17 to an arm 18 which is mounted on a square shaft 19 supported in bearings 20 on the frame. The seed feeding mechanism of the hoppers is actuated by a square shaft 21 which is adapted to be driven by a sprocket 22. The sprocket 22 is driven by a sprocket chain 23 which is positioned on a sprocket 24 secured to one of the shafts 14 and on a sprocket 25 mounted on a shaft 26 supported on a frame 27. The frame 27 is pivoted as at 28 to a bearing 29 on the frame 12 and is adapted to swing toward and away from the sprocket 22 so that the sprocket chain 23 may be moved into and out of engagement with the sprocket 22.

Heretofore it has been necessary for an operator on the planter to control the seed drills whether it was drawn by horses or by a tractor, so that when a tractor is used an operator for the tractor and an operator for the planter was required. With my improved power lift the tractor operator can successfully control the seed drills from the tractor thus eliminating the operator on the planter.

As shown my improved power lift includes a disk 30 secured to a shaft 31 which is supported in bearings 32 mounted on brackets 33 secured to the frame 12. The shaft 31 is adapted to be rotated by a sprocket 34 secured thereto and the sprocket 34 is adapted to be driven by a sprocket chain 35 which in turn is driven by a sprocket 36 loosely mounted on one of the wheel shafts 14. The sprocket 36 includes a clutch mechanism which comprises a sleeve 37 having a flanged groove 38 therearound and the end of the sleeve is notched as at 39 to receive a pin 40 on the shaft 14.

When the planter is in operation and the pin 40 is positioned in the notch 39 the shaft 14 will rotate the sprocket 36 and through the medium of the chain 35 and sprocket 34 will drive the shaft 31. For moving the clutch sleeve 37 into and out of engagement with the pin 40 I provide a lever 41 which is pivoted intermediate its length as at 42 to the frame 12. One end of the lever 41 is provided with a forked portion 43 which is positioned in the clutch groove 38 and the opposite end is pivotally connected as at 44 to one end of a rod 45. The opposite end of the rod 45 is pivotally connected as at 46 to one end of a bell crank arm 47 as clearly shown in Fig. 5.

The arm 47 is pivoted intermediate its length as at 48 to the bracket 33 and the opposite end of the rocker arm is pivoted as at 49 to one end of a rod 50. The opposite end of the rod 50 is provided with an elongated aperture 51 in which is positioned a pin 52 secured to an operating lever indicated generally at 53. This operating lever 53 comprises two portions 54 and 55 positioned one on each side of the disk 30 and pivotally connected as at 56 to the bracket 33.

Positioned between the portions 54 and 55 I provide a roller 57 which is rotatably mounted on a stud 58 secured to the portions 54 and 55 as clearly shown in Fig. 4. The roller 57 is adapted to be normally urged into engagement with the periphery of the disk 30 by a coiled spring 59 and in certain positions of the disk the roller is adapted to be positioned in recesses 60 and 61 on the disk. Adjacent the upper end of the lever portion 55 I provide an aperture 62 for securing to the lever an operating cord 63 which may extend to the tractor or other appliance which is drawing the planter.

Secured to opposite sides of the disk 30 I provide a pair of clutch release fingers 64 and 65. On one face of the disk as at 66 I provide a rotatable block 67 (see Figs. 2 and 3) which includes an aperture 68. A rod 70 is positioned in the aperture 68 and is adapted to be freely rotated therein. Longitudinal movement of the rod relative to the block is prevented by collars 71 which are secured to the rod on each side of the block 67.

The rear end of the rod 70 is screw threaded as at 72 and is positioned in a similarly screw threaded block 73 which is rotatably connected as at 74 to a pair of arms 75 which are mounted on the square shaft 19.

When the planter 10 is operating and the seed drills 16 are in a lowered position the roller 57 is positioned in the disk recess 60 as shown in Fig. 2. When it is desired to raise the seed drills 16 the operator swings the lever 53 away from the disk 30 thereby moving the roller 57 out of the recess 60 and at the same time moving rod 50 forward. As the rod 50 thus moves it swings the rocker arm 47 on its pivot 48 thereby causing it to push the rod 45 which in turn swings the lever 41 on its pivot 42. As the lever 41 is thus swung it moves the clutch sleeve 37 from the position shown in Fig. 1 to the position shown in Fig. 3 wherein the pin 40 is positioned in the notches 39 of the clutch sleeve. When the clutch sleeve 37 is thus coupled to the shaft 14 and the shaft is rotated by the wheel 13 the sprocket 36 will be rotated and drive the sprocket 34 through the medium of the sprocket chain 35 thereby driving the shaft 31 and rotating the disk 30.

When the disk 30 has started to rotate the operator releases the lever 53 and the coiled spring 59 draws the roller 57 into engagement with the periphery of the disk. This movement of the lever 53 will not effect the rod 50 as the slot 51 allows the pin 52 to move therein without moving the rod 50 as the slot 51 allows the pin 52 to move therein without moving the rod 50, thus the clutch mechanism remains in engagement and continues to rotate the disk.

As the disk 30 rotates in the direction of the arrow in Fig. 2 it moves the rod 70 rearwardly thereby swinging the arms 75 rearwardly and downwardly which turns the shaft 19 and causes the arms 18 to swing upwardly thereby raising the seed drills 16.

The disk 30 continues to rotate and raise the seed drills 16 until the finger 64 engages the rocker arm 47 as shown in Figs. 5 and 6 whereupon the finger 64 swings the rocker arm on its pivot 48. As the rocker arm 47 is thus moved it pulls the rod 45 which in turn swings the lever 41 on its pivot to move the clutch sleeve 37 out of engagement with the pin 40 on the shaft 14 thereby disengaging the clutch mechanism whereupon the roller 57 enters the disk recess 61 and prevents further movement of the disk.

To lower the seed drills the operator again causes the lever 53 to swing away from the disk thus moving the roller out of the recess 61 and moving the clutch mechanism into engagement to rotate the disk as previously described. As the disk now rotates it pulls the rod 70 forward thus swinging the arms 75 upward and forward and the arms 18 downward thereby moving the seed drills 16 downward. The seed drills continue to move downward until the clutch mechanism is moved to a disengaged position by the finger 65 as previously described in connection with the finger 64.

The screw threaded portion 72 of the rod 70 allows the depth to which the seed drills 16 are lowered to be adjusted and for turning the rod 70 I provide a crank 78 which is preferably hingedly secured to the rod 70 as as 79 so that it may be folded out of the way when not in use.

For controlling the operation of the shaft 21 in unison with the raising and lowering of the seed drills I provide a rod 80 which is positioned in bearings 81 secured to the frame 12. This rod 80 includes an upstanding arm 82 having an angularly bent end portion 83 which is positioned in an elongated aperture in the frame 27. Secured to the rod 80 I provide an upstanding arm 84 which is pivotally connected as at 85 to one end of a bar 86. The opposite end of the bar 86 is pivotally connected as at 87 to a crank arm 88 secured to the shaft 31.

The crank arm 88 is so positioned on the shaft 31 that when the disk 30 rotates to raise the seed drills it moves the arm 82 forwardly through the medium of the bar 86 and arm 84, thereby swinging the frame 27 forwardly and moving the sprocket chain 23 out of engagement with the sprocket 22, thus stopping the actuation of the seed distributing mechanism.

When the disk 30 rotates to lower the seed drills the crank arm 88 through the medium of the bar 86, arm 84 and rod 80, moves the frame 27 rearwardly thereby moving the chain 23 into engagement with the sprocket 22 whereupon the seed distributing mechanism is again put in operation.

From the foregoing description it will be apparent that I have provided a novel power lift for the seed drills of a planter which is simple in construction and highly efficient in use.

Having thus described my invention, I claim:

1. A seed planter comprising a main frame, said frame being supported on a plurality of wheels including rotatable shafts, a plurality of seed drills movably supported on said frame, a disk, a shaft for said disk, a sprocket secured to said disk shaft, another sprocket loosely positioned on one of said wheel shafts, a sprocket chain connecting said first and second sprockets, clutch means whereby said second sprocket may be coupled to said wheel shaft, clutch operating means to engage and disengage said clutch means, said operating means including a lever, a stud secured to said lever, a roller rotatably mounted on said stud, said disk having a pair of opposed recesses in the periphery thereof, said roller being normally adapted to be positioned in one of said recesses, a pair of opposed fingers on said disk, said lever upon movement away from said disk being adapted to move said clutch means into engagement to drive said second sprocket and said second sprocket being adapted to rotate said disk through the medium of said first sprocket and said disk shaft, a rod, said rod being mounted on said disk, means connecting said rod and said seed drills whereby when said disk rotates said rod will be moved to either raise or lower said seed drills, said opposed fingers on said disk being adapted to automatically disengage said clutch means when said seed drills have reached their limit of movement upward or downward.

2. A seed planter comprising a main frame, said frame being supported on a plurality of wheels including rotatable shafts, a plurality of seed hoppers on said frame, a plurality of seed drills associated with said hoppers, said seed drills being movably supported on said frame, a disk, said disk being secured to a shaft supported in a plurality of bearings on said frame, a sprocket secured to said shaft, another sprocket loosely positioned on one of said wheel shafts, a sprocket chain connecting said first and second sprockets, clutch means whereby said second sprocket may be coupled to said wheel shaft, clutch operating means to engage and disengage said clutch means, said operating means including a lever, a stud secured to said lever, a roller rotatably mounted on said stud, a coiled spring, one end of said spring being connected to said lever and the opposite end of said spring being suitably anchored, said spring being adapted to resiliently urge said roller into engagement with the periphery of said disk, said disk having a pair of opposed recesses in the periphery thereof, said roller being normally adapted to be positioned in one of said recesses, a pair of opposed fingers on said disk, said lever upon movement away from said disk being adapted to move said clutch means into engagement to drive said second sprocket and said second sprocket being adapted to rotate said disk through the medium of said first sprocket and said disk shaft, a rod, said rod being pivotally mounted on said disk, means connecting said rod and said seed drills whereby when said disk rotates said rod will be moved to either raise or lower said seed drills, said opposed fingers on said disk being adapted to automatically disengage said clutch means when said seed drills have reached their limit of movement upward or downward.

3. A seed planter comprising a main frame, means to support said frame, said means including a plurality of wheels including rotatable shafts, a plurality of seed hoppers on said frame, a plurality of seed drills associated with said hoppers, a drill shaft, arms on said shaft pivotally connected to said drills, a lever on said drill shaft, a threaded block pivotally connected to said lever, a disk, another shaft, said disk being secured to said other shaft, said other shaft being supported in a plurality of bearings on said frame, a sprocket secured to said other shaft, another sprocket loosely positioned on one of said wheel shafts, a sprocket chain connecting said two sprockets, clutch means whereby said second sprocket may be coupled to said wheel shaft, means to engage and disengage said clutch means, an apertured block pivotally connected to said disk, a rod, said rod being positioned in said apertured block and rotatable therein, means to prevent longitudinal movement of said rod relative to said disk block, an operating handle on said rod, a threaded portion on said rod, said threaded portion being positioned in said threaded aperture of said lever block, said disk upon rotation thereof being adapted to move said rod to rock said lever said drill shaft and the drill arms to raise or lower said drills, the limit of the raising and lowering movement of said drills being controlled by the position of said lever block on said threaded portion of said rod.

4. A seed planter comprising a main frame, a plurality of wheels including rotatable shafts for supporting said frame, a plurality of seed drills movably supported on said frame, a disk, a shaft for said disk, a sprocket secured to said disk shaft, another sprocket loosely positioned on one of said wheel shafts, a sprocket chain connecting said first and second sprockets, a rod, said rod being mounted on said disk, means connecting said rod and said seed drills whereby when said disk rotates said rod will be moved to either raise or lower said seed drills, a seed feeding means, said means including a third sprocket on one of said wheel shafts, a pivoted frame, a fourth sprocket supported on said frame, a sprocket chain connecting said third and fourth sprockets and a fifth sprocket adapted to be engaged by said chain, a crank arm on said disk shaft, a pivoted rocker arm on said main frame, means connecting said crank arm and said rocker arm, a portion of said rocker arm engaging said pivoted frame, said crank arm upon actuation of said disk to raise said seed drills being adapted to swing said frame on its pivot and move said chain out of engagement with said fifth seed feeding sprocket and upon actuation of said disk to lower said seed drills to swing said pivoted frame to move said chain into engagement with said fifth seed feeding sprocket.

5. A seed planter comprising a plurality of wheels including rotatable shafts, a main frame supported on said wheels, a plurality of seed drills movably supported on said frame, a disk, a shaft for said disk, a sprocket secured to said disk shaft, a second sprocket loosely positioned on one of said wheel shafts, a sprocket chain connecting said first and second sprockets, clutch means whereby said second sprocket may be coupled to said wheel shaft, means to operate said clutch, said means including a lever, a roller rotatably mounted on said lever, said disk having a pair of opposed notches in the periphery thereof, said roller being normally adapted to be positioned in one of said notches, said lever upon movement away from said disk being adapted to move said clutch into engagement to drive said second sprocket and said second sprocket being adapted to rotate said disk through the medium of said first sprocket and said disk shaft, a rod, said rod being mounted on said disk, means connecting said rod and said seed drills whereby when said disk rotates said rod will be moved to either raise or lower said seed drills, means adapted to automatically disengage said clutch means when said seed drills have reached their upward or downward limit of movement, a seed feeding means, said means including a third sprocket on one of said wheel shafts, a pivoted frame, a fourth sprocket supported on said frame, a sprocket chain connecting said third and fourth sprockets and a fifth sprocket adapted to be engaged by said chain, a crank arm on said disk shaft, a pivoted rocker arm on said main frame, means connecting said crank arm and said rocker arm, a portion of said rocker arm engaging said pivoted frame, said crank arm upon actuation of said disk to raise said seed drills being adapted to swing said frame on its pivot and move said chain out of engagement with said fifth seed feeding sprocket and upon actuation of said disk to lower said seed drills to swing said pivoted frame to move said chain into engagement with said fifth seed feeding sprocket.

6. A seed planter comprising a main frame, means to support said frame, said means including a plurality of wheels including rotatable shafts, a plurality of seed drills movably supported on said frame, a disk, a shaft for said disk, a sprocket secured to said disk shaft, a second sprocket loosely positioned on one of said wheel shafts, a sprocket chain connecting said first and second sprockets, clutch means whereby said second sprocket may be coupled to said wheel shaft, clutch operating means to engage and disengage said clutch means, said operating means including a lever, a stud secured to said lever, a roller rotatably mounted on said stud, said disk having a pair of opposed notches in the periphery thereof, said roller being normally adapted to be positioned in one of said notches, a pair of opposed fingers on said disk, said lever upon movement away from said disk being adapted to move said clutch means into engagement to drive said second sprocket and said second sprocket being adapted to rotate said disk through the medium of said first sprocket and said disk shaft, a rod, said rod being mounted on said disk, means connecting said rod and said seed drills whereby when said disk rotates said rod will be moved to either raise or lower said seed drills, said opposed fingers on said disk being adapted to automatically disengage said clutch means when said seed drills have reached their limit of movement upward or downward, a seed feeding means, said means including a third sprocket on one of said wheel shafts, a pivoted frame, a fourth sprocket supported on said frame, a sprocket chain connecting said third and fourth sprockets and a fifth sprocket adapted to be engaged by said chain, a crank arm on said disk shaft, a pivoted rocker arm on said main frame, means connecting said crank arm and said rocker arm, a portion of said rocker arm engaging said pivoted frame, said crank arm upon actuation of said disk to raise said seed drills being adapted to swing said frame on its pivot and move said chain out of engagement with said fifth sprocket and upon actuation of said disk to lower said seed drills to swing said pivoted frame to move said chain into engagement with said fifth seed feeding sprocket.

In testimony whereof, I hereunto affix my signature.

JULIAN A. ALEGRIA.